(12) United States Patent
Carryer

(10) Patent No.: US 9,874,933 B1
(45) Date of Patent: Jan. 23, 2018

(54) DEVICE SHUTDOWN ROUTINE OPTIMIZATION

(71) Applicant: Amazon Technologies, Inc., Seattle, WA (US)

(72) Inventor: Straker Carryer, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 262 days.

(21) Appl. No.: 14/739,758

(22) Filed: Jun. 15, 2015

(51) Int. Cl.
| | |
|---|---|
| *G06F 3/033* | (2013.01) |
| *G06F 3/01* | (2006.01) |
| *G09G 3/34* | (2006.01) |
| *G06F 3/00* | (2006.01) |

(52) U.S. Cl.
CPC .............. *G06F 3/013* (2013.01); *G06F 3/002* (2013.01); *G06F 3/011* (2013.01); *G09G 3/3413* (2013.01); *G09G 2330/022* (2013.01); *G09G 2330/027* (2013.01); *G09G 2354/00* (2013.01); *G09G 2360/144* (2013.01); *G09G 2380/14* (2013.01)

(58) Field of Classification Search
CPC ..... G06F 1/1684; G06F 1/1694; G06F 1/3206
See application file for complete search history.

(56) References Cited

U.S. PATENT DOCUMENTS

| | | | |
|---|---|---|---|
| 9,094,539 B1* | 7/2015 | Noble | ........................ H04N 7/00 |
| 2016/0209904 A1* | 7/2016 | Imana | .................... G06F 1/3206 |

* cited by examiner

*Primary Examiner* — Nelson Rosario
(74) *Attorney, Agent, or Firm* — Lee & Hayes, PLLC

(57) ABSTRACT

This disclosure is directed to creation of a shutdown routine for an electronic device. A device may detect, via one or more sensors, one or more conditions associated with the environment of the handheld electronic device to optimize a shutdown routine for a particular use case. For instance, the user may be using the device to aid in the process of falling asleep and the shutdown routine may be optimized to aid that process. In addition, the system may monitor user interaction after an optimized shutdown routine has been executed to determine an effectiveness of the optimized routine for the particular use case. Optimized shutdown routines may be associated with the one or more conditions and used as a baseline for future use cases of the user or other users where similar conditions are detected.

18 Claims, 6 Drawing Sheets

DEVICE SHUTDOWN ROUTINE OPTIMIZATION

BACKGROUND

Books, magazines, and other similar media content are increasingly being delivered and consumed in electronic format, rather than on traditional paper or other physical media. In particular, the electronic formats are increasingly being consumed on handheld electronic devices. Often, a reader's experience is dependent on the reading conditions and the intent of the reader. For example, a reader may have a bedtime reading ritual to aid in transitioning the reader to sleep. Each individual reader brings a unique reading routine (style and intent of the reader) to each reading session.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

This disclosure is directed to systems, devices, and techniques for determining a shutdown routine for a client device. The handheld device (or simply "device") may be an electronic-book reading device, a mobile phone, tablet computing device, or similar device. The shutdown routine may be determined from a variety of user characteristics and current conditions associated with the device. For example, user characteristics may include data from a user account associated with the device (i.e., a user profile or user account data). User account data may include one or more sets of predetermined user preferences and/or data collected by an associated user device such as a heart rate monitor, or similar device that generates biometric data.

In some embodiments, the handheld device may track user interactions with the handheld device or receive data from an associated user device to determine an optimized shutdown routine. For example, the device may track a history of user activity associated with the user and/or the device to determine a likely beginning and a likely end time for a future use session of the reader (e.g., reading a book to aid in falling asleep may start at 9:00 P.M. and may be estimated to end at 9:45 P.M.). Additionally, the device may receive an indication of the user's intent to shut down the device at a predetermined time in the future. For example, the user may set an alarm for the next morning on the handheld device and/or an associated device, such as a mobile phone or tablet, indicating that the user is likely going to bed and will likely be sleeping in the near future. Sleeping habits may be inferred from device usage data (i.e., from the handheld device and/or one or more associated devices) and/or biometric data received from the handheld device and/or associated device.

The systems, devices, and techniques described herein may be implemented in a number of ways. Example implementations are provided below with reference to the following figures.

Figure 1:
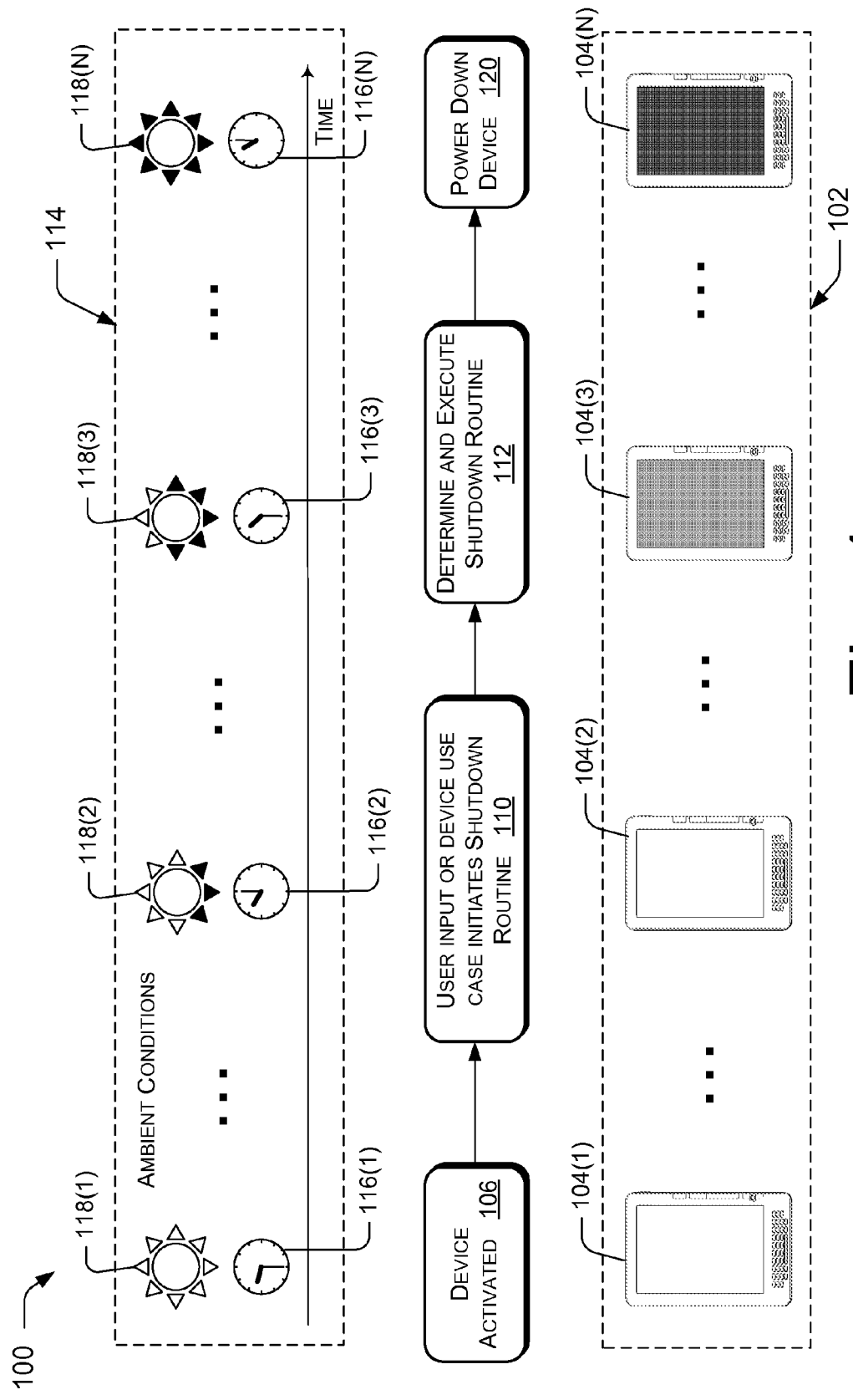
FIG. 1 is a schematic diagram of an illustrative environment for optimizing the shutdown routine of a client device. The environment includes one or more current conditions, including, for example, a measure of ambient light and a time of day.

FIG. 1 is a schematic diagram of an illustrative environment 100 for optimizing a shutdown routine 102 of a client device 104. An optimized shut down routine may be initiated when the client device 104 is activated 106. Once activated, the client device 104 may generate common use characteristics associated with the client device 104 and/or the user associated with a client device 104 (e.g., a user logged into the device, or logged into a service via the device). Common use characteristics may include user activity conducted via the device, such as website search history, phone calls, access of applications stored on the device, etc. Additionally or alternatively, use characteristics may come from one or more other devices associated with the user, the other devices being in addition to the client device 104. For instance, the user may have a mobile phone or tablet with a user account that associates the user with the client device and the other devices such that use characteristics may be shared between the client device and the other devices via a host connected to a network.

Additionally, use characteristics may be associated with time of day and ambient conditions at the time the use characteristic was recorded. For instance, the client device 104, or other devices, may detect a user browsing an electronic-commerce website at noon under full light conditions. The client device 104 or other device may record the use characteristics and record the data on the device or send the data to a remote host. In some embodiments, the client device 104 may detect changing ambient light conditions. For instance, at a first time 116(1) the client device 104 may detect full light conditions 118(1). As the day progresses from 116(1) to 116(N), the client device 104 may detect continuously reduced ambient light from 118(1) to 118(N).

At 110, the device 104 may detect one or more user characteristics or a combination of sensor measurements that trigger initiation of a shutdown routine. The shutdown routine may change the client device 104 display settings via the brightness, hue, etc. from 104(1) to a shutdown or power savings state at 104(N). For instance, the device may determine, via sensors (e.g., accelerometers, optical sensor, biometric sensors, etc.) that the client device 104 is no longer in use, or that the client device 104 has been placed on a shelf or desk. Additionally or alternatively, the device may initiate a shutdown routine after detecting a period of device inactivity that is longer than a predetermined threshold amount of time (i.e., the user fell asleep). The period of device inactivity may also be a slowed rate of interaction with the device. For instance, the device may detect that the user is turning pages at a slower rate, or the rate of clicks on website browser links may be at a slower pace than is typical during awake hours or average use conditions. The device may also execute an immediate or accelerated shutdown routine after a second period of inactivity that is longer in duration than the predetermined period of inactivity to optimize power savings.

In some embodiments, historical accelerometer data can be used to determine common use conditions of the device and which are associated with a user of the device. For instance, a device may detect accelerometer measurements typical of running or jogging and associate the user's activities while running with the activity. If the user often consumes a book or video media (e.g., movies, etc.) while running, the detected period of inactivity, or reduced rate of activity while running may not initiate a shutdown routine, because the associated activity, running, is not likely required.

In further embodiments, the device may use a camera to detect the presence of a user in front of the device. The camera may further capture via video or still image, the eye activity of a user to determine a level of engagement of the user with the current content being displayed on the device. The level of engagement could be associated with high stress levels or excitement or alternatively with falling asleep. For example, the camera may capture an image of dilated pupils or a low blink rate of the user's eyes and determine that the user is excited or scared. Alternatively, sagging eyelids or a more rapid blink rate associated with a tiredness (or sleepiness) level of the user. The device may factor in the relevant eye activity to determine that a shutdown routine is appropriate to initiate or not and also to determine the rate of shutdown based on the observed user characteristics.

In still other embodiments, additional biometric data may be factored into a determination that a shutdown routine will be initiated and the characteristics of the shutdown routine that is initiated. For instance, heart rate data may be used alone or in combination with accelerometer data and/or camera data described above to improve the accuracy or confidence in the determination that a specific routine should or should not be implemented. For example, an accelerated heart rate in coordination with an accelerometer indication that the user is running may yield a high confidence that a shutdown routine will not be initiated. Alternatively, a slowing heart rate and a detection of sagging eyelids may result in a high confidence that a shutdown routine should be initiated with a relatively fast rate to full power-down.

In some embodiments, the device may trigger initiation of a shutdown routine after receiving an indication or detecting that the user's heart rate and/or blood pressure has reduced below a threshold level or that the user has experienced a change in heart rate and/or blood pressure that is greater than a threshold level. Additionally or alternatively, the device may compare the current heart rate and/or blood pressure to a user's typical or average heart rate and/or blood pressure during sleep to determine that the user is sleeping. If the user is determined to be sleeping the client device may accelerate the shutdown rate or go to a power saving mode. For instance, the heart rate data may be measured directly from the device, via a sensor, or it may be supplied via a second device associated with the user. In further embodiments the data can be shared directly with the device via a wireless or wired data communication link (e.g., WiFi or Bluetooth), or the data may be supplied via a communication network via one or more remote servers.

At 112, the device may determine and execute a shutdown routine. For instance, the device may receive or determine current conditions 114 associated with the client device. The current conditions 114 may include a current time 116 at the location of the client device 104. Additionally or alternatively, the conditions may include lighting conditions 118 detected by an ambient light sensor onboard the client device 104. Current conditions may be continuously or periodically determined by the client device 104 and/or received from a remote host for determination of an optimized shutdown routine 112. Methods for determining the optimized shutdown routine are discussed with additional detail at least with respect to FIGS. 4-6. In some embodiments, the client device may detect a high level of ambient light during daytime hours and determine that the user is not likely trying to fall asleep. The determined shutdown routine may execute at a faster rate relative to a conditions comprising low levels of ambient light detected during night time hours (i.e., the user of the client device is likely trying to fall asleep). In still further embodiments, the user may set an alarm during daytime hours for some time in the near future (e.g., thirty minutes) to wake up from a nap. Under these conditions, the device may determine that a shutdown routine may be executed at a rate slower than a when no alarm is scheduled during the daytime hours.

At 120, the device may complete power down of the device or the device may go into a power-saving mode. In some embodiments, the shutdown routine may determine that the shutdown routine has progressed below a threshold power level and rapidly accelerate the shutdown routine to a powered down state of the device. Additionally or alternatively, the client device 104 may detect an event or series of events indicative of a user's intent to discontinue use of the device and rapidly accelerate the shutdown routine or immediately proceed to a powered down state of the device. For instance, the client device 104 may detect or receive an indication that the user has fallen asleep (e.g., from biometric data such as heart rate or sleep state) and initiate an accelerated shutdown or enter a power-saving state.

In some embodiments, the shutdown routine comprises reduced power supplied to the display of the client device at a determined rate. In still further embodiments, the shutdown routine may be a change in the hue or wavelength of the display light from a warm-to-cool hue to aid the user in falling asleep, or a cool-to-warm hue transition to aid the user in waking. Still further, the shutdown routine may be a combination of power and hue changes to the display of the client device.

Figure 2:
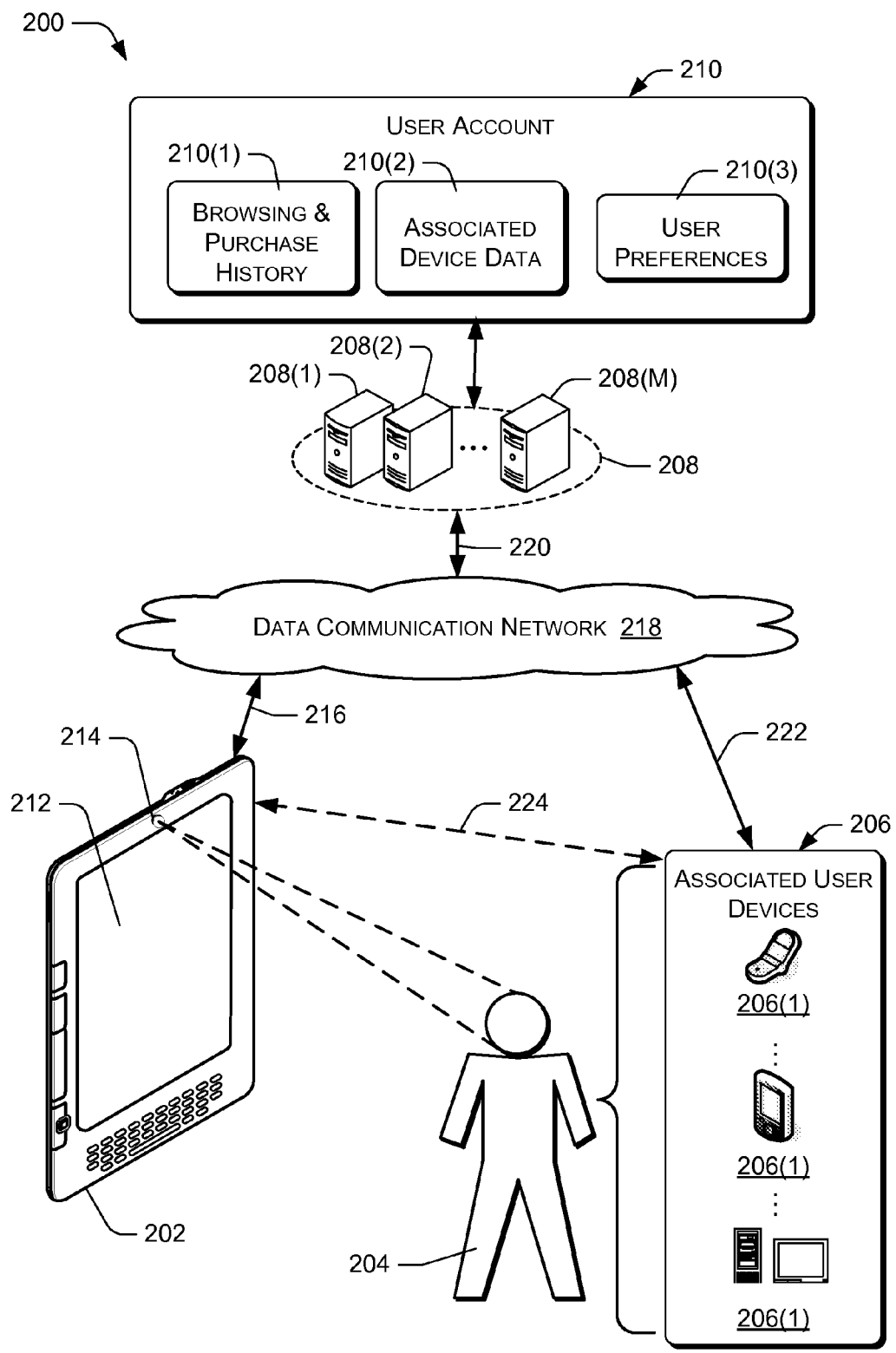
FIG. 2 shows an illustrative computing environment for a handheld client device including a user, one or more associated user devices, and a user account associated with the client device.

FIG. 2 shows an illustrative computing operating environment 200 for a client handheld device 202 including a user 204, one or more associated user devices 206, and a user account 210 associated with the client device 202.

A user 204 is associated with a client device 202 and/or one or more associated computing devices ("associated devices") 206(1), . . . , 106(N) that access the user account 210 via a network 218. The network 218 is representative of many different types of networks, such as cable networks, the Internet, local area networks, mobile telephone networks, wide area networks and wireless networks, or a combination of such networks.

The user account 210 may be hosted on one or more servers 208(1), . . . , 208(M), perhaps arranged as a server farm. Other server architectures may also be used to implement the user account 210. The one or more servers 208(1), . . . , 208(M) are capable of handling requests from many users and serving, in response, various information and data to the client device 202 and/or associated devices 206(1)-(N). The servers 208(1)-(M) include content servers capable of facilitating interaction by the client device 202 between the user 204 and the user account 210 via the network 218. In this manner, the user account 210 is representative of essentially any site supporting user interaction, including access to online media content (e.g., books, music, magazines, movies and video, etc.), and so forth.

The client device 202 may be implemented in any number of ways. In FIG. 2, the client device 202 is illustrated as a tablet or handheld reader device and the associated devices 206 are illustrated as a wireless telephone 206(1), a tablet or personal data assistant 206(2), and a personal computer 206(N). However, other example implementations of the devices include a television set-top box, a game console, a portable gaming device, a digital video recorder, a portable computer, electronic book readers, and other electronic or entertainment devices. The client device 202 and associated devices 206(1)-(N) may include integrated media capture hardware and/or software, such as a camera, a microphone, and so forth. For example, the client device 202 may include a camera for capturing an image or video, a microphone and software to record a personalized message, etc.

The user 204 employs the client device 202 to interact with the user account 208 residing on the host server(s) 208(1)-(M). In one scenario, the client device 202 sends a request to the host server(s) 208(1)-(M) via the data communication network 218. The request may be a uniform resource identifier (URI) request or other types of requests.

The host servers 208(1)-(M) may be equipped with one or more processors and memory. The memory may include applications, modules, and/or data. The applications, modules, and/or data may facilitate the capture and analysis of user data to determine optimal shutdown routines for the client device 202.

The client device 202 has a display 212. The client device 202 may also have a shutdown routine optimization system including one or more modules to determine an optimized shutdown routine for the client device 202. The shutdown routine optimization system is described in more detail with respect to FIG. 3. Additionally, the client device 202 may have one or more sensors, including, for example a video camera 214, an accelerometer, and/or heart rate monitor.

The video camera 214 may monitor user activity and/or inactivity associated with the device. For example, the video camera 214 may periodically or continuously capture still images or video images to determine that a user 204 associated with the device is present within the viewable angle of the camera (e.g., the user 204 is looking at the device). When no user 204 is detected within the viewable area of the camera may transmit an indication to the shutdown routine optimization system. The indication may be used by the shutdown routine optimization system, in part, to determine that a user 204 has likely put the device down and, and in response, to accelerate the shutdown routine, power down the device, or put the device in a power savings mode, for example.

The client device 202 may transmit and receive data 216 via a wired or wireless data communication network 218. The data communication network 218 may include the user account data 210 associated with the user 204 and/or the client device 202. The user account data 208 may include, for example, browsing and purchase history 210(1) associated with the user 204 and/or the client device 202, associated device data 210(2), and/or user preferences 210(3). Associated device data 210(2) may consist of one or more associated user devices 206, including and in addition to the client device 202, that generate data that may be used by the shutdown routine optimization system to determine an optimized shutdown routine for the device.

For instance, an associated device 206 may include a heart rate monitor, sleep monitoring device, or similar device that generates biometric data. Additionally, or alternatively, an associated device 206 may include a mobile device such as a mobile phone or tablet. The associated device(s) 206(1)-(N) may transmit and receive data to and from the data communication network 218 via a wireless or network connection 222. Additionally, or alternatively, an associated user device 206 may transmit and/or receive data directly to and from the client device 202 via a wired or wireless data connection 224.

Figure 3:
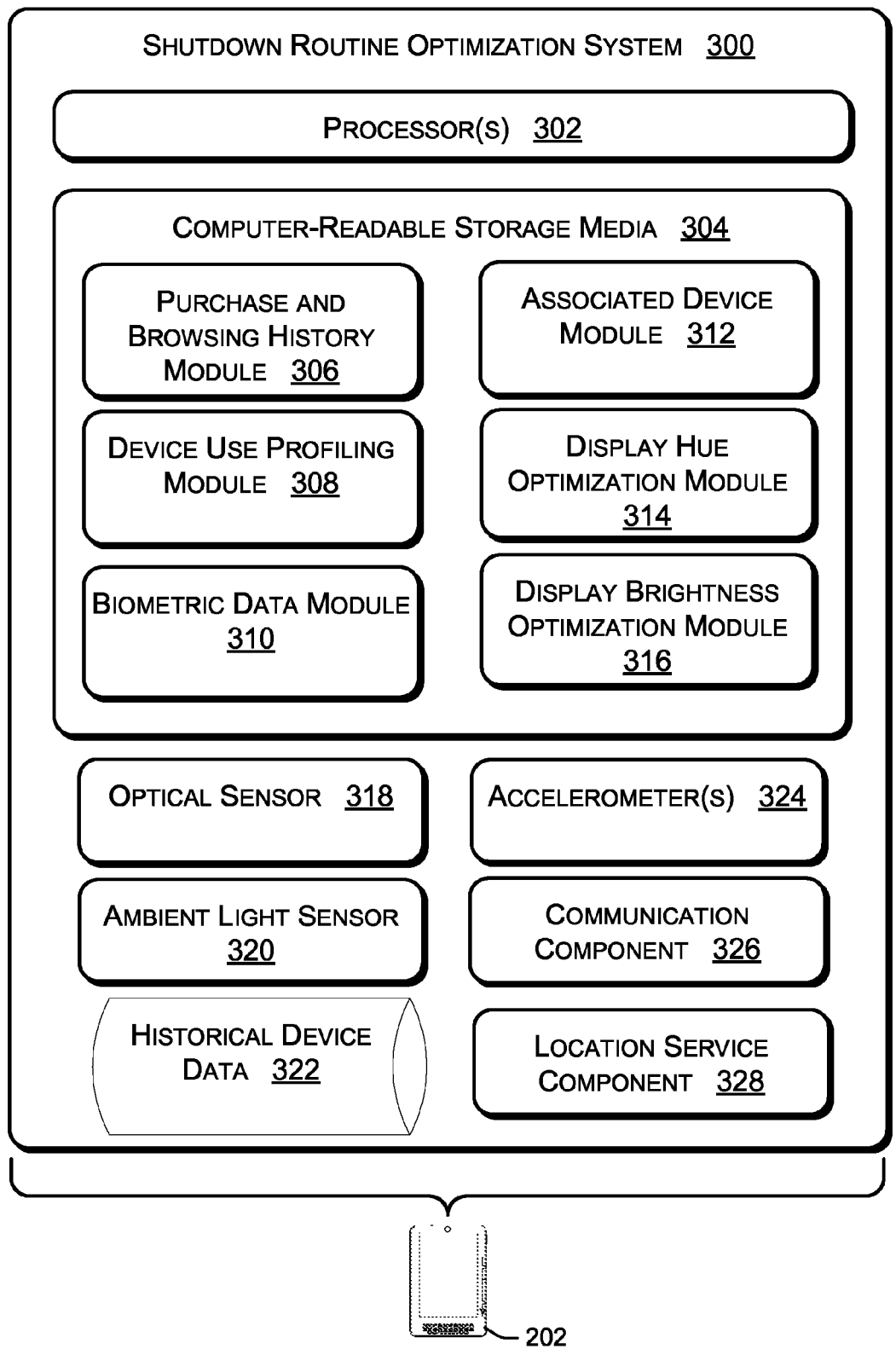
FIG. 3 is a block diagram illustrative of the relevant components of a device shutdown optimization system.

FIG. 3 is a block diagram illustrative of the relevant components of the device. The system 300 is described with reference to FIGS. 1 and 2.

The system 300 may comprise one or more processors 302 and a computer-readable storage media 304 storing one or more modules for determining an optimized shutdown routine. Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by an Internet download.

In some embodiments, the system 300 may include a purchase and browsing history module 306 to receive and aggregate user data associated purchase and browsing history of the client device 202, the user 204 associated with the client device 202, or user account data 208 associated with the user 204 and/or associated with the client device 202. In further embodiments, the purchase and browsing activity may be electronic-commerce ("e-commerce") transactions or browsing associated with one or more e-commerce websites. Furthermore, purchase and browsing history aggregated by the purchase and browsing history module 306 may include an associated location. For instance, the client device 202 may acquire, via a global positioning system or similar location service component 328, a location at the time of an e-commerce website is accessed by the client device 202.

In some embodiments, the system 300 may have a device use profiling module 308 to analyze user 204 interactions with the device 202 and/or data received by the device (e.g., associated user device data, purchase and browsing history, etc.). In further embodiments, the profiling module 308 may be remote from the device 202. For instance, the profiling module 308 may be stored in a remote server or computing device (i.e., stored in the cloud) and account data may analyzed and the results sent to the device 202 via a wired or wireless communication network.

In some embodiments, the device use profiling module 308 may analyze purchase and browsing history collected by the purchase and browsing history module 306, and determine one or more trends associated with the client device 202 and/or a user 204 associated with the client device 202 to predict one or more periods of time that the device is likely to be at least one of active or inactive. Additionally or alternatively, the profiling module 310 may associate a confidence value with each period of activity and/or inactivity. Individual confidence values reflect the likelihood or accuracy of the predicted device use. Active and inactive periods may be incorporated into the optimized shutdown routine to determine a rate of shutdown, or a time when the client device 202 can be completely shut down or put into a power saving mode.

In additional embodiments, the shutdown system 300 may further comprise a biometric data module 310. The biometric data module 310 may receive biometric data from the client device 202 and/or one or more associated devices 206. For instance, the biometric data module may receive heart rate data, blood pressure, sleep data (e.g., current state, sleep trends, etc.), eye movement, etc. from the biometric sensors of the client device 202, or remotely from a user account 208 and/or one or more associated user devices 206. Biometric data may be used to estimate a current use condition. For example, the client device 202 may detect rapid eye movement from a user 204 of the device and therefore determine that the user 204 is engaged in reading from the device and/or interacting with the device and therefore not sleeping. Similarly, heart rate data may be used to determine that the user 204 of the client device 202 is engaging with the client device 202. In yet another example, breathing patterns may be associated with the user engagement of the client device 202. For instance, the client device 202 may record audio recordings of the user's breathing to determine breathing patterns associated with particular use conditions of the client device 202.

The profiling module 308 may receive data trends associated with the biometric data in order to predict common use habits of the device and/or a user 204 associated with the device. For instance, in some embodiments the client device 202 may detect, or receive from an associated user device 206, an indication that the user 204 of the client device 202 has an elevated heart rate relative to a baseline heartrate associated with the user 204. Further, the user 204 may be consuming a book or media content and the client device 202 may determine that the user 204 is engaged with the device even when no other inputs are received.

In some embodiments, the user device 206 may receive audio recordings of the user 204 and analyze the recordings for indications of a breathing pattern of the user. The In still further embodiments, the shutdown system 300 may use historical biometric data to determine a period of time when a user 204 is likely to be exercising. For instance, if a user 204 historically exercises at 10:00 P.M. (determined from calendar data, accelerometer data, etc.) and a user 204 sets an alarm for the following morning at 10:15 P.M. and is subsequently interacting with the client device 202—a combination that may indicate a bed time routine and therefore may trigger a start of a shutdown routine—the shutdown system 300 may suspend the shutdown routine for a period determined to be a typical exercise period for a user 204. Historical biometric data may also be complemented with current heart rate, or blood pressure data to increase the accuracy of the determination that a user 204 associated with the device is, in fact, exercising. Additionally, or alternatively, as will be discussed in more detail, the device may also increase the accuracy by accessing electronic calendar data of one or more associated devices 206 to identify a scheduled trip to the gym. The shutdown system 300 may then adjust its estimated exercise time to correspond with the scheduled gym trip from the electronic calendar.

In some embodiments, the shutdown systems 300 may determine an optimized shutdown routine based at least in part on the biometric data received at the biometric data module 310. For example, the shutdown system may initiate with a baseline shutdown routine for the client device 202, the baseline shutdown procedure having been determined from historical use of the device over a period of time. If the device detects, or receives an indication, that the user 204 of the device has set an alarm on the client device 202 or an associated device 206, thereby signaling an intention to go to sleep, and the client device 202 detects or receives via biometric data (e.g., accelerated heart rate because of a suspenseful section of a book) the client device 202 may determine that an accelerated shutdown procedure may be helpful to encourage the user 204 to fall asleep.

The system 300 may further include an associated device module 312. The associated device module 312 may store an indication and/or historical data of one or more devices associated with a user 204 of the client device 202. Additionally, the associated device module 312 may send and/or receive user data directly or indirectly (e.g., via WiFi, Bluetooth, and/or radio communication methods) to and/or from one or more associated devices 206. For instance, the system 300 may receive an indication of a calendar entry that may be indicative of the need to determine and execute a shutdown routine on the client device 202. In an additional example, the system 300 may receive an indication that a user 204 associated with the client device 202 set an alarm for the following morning on a second device that is associated with the user 204. The system 300 may determine that the indication of the set alarm on the associated device 206 triggers a shutdown routine for the client device 202 to help the user 204 of the client device 202 fall asleep more efficiently.

The system 300 may receive data from one or more modules (e.g., the purchase and browsing history module 306, profiling module 308, biometric data module 310, and/or the associated device module 312) to determine an optimized shutdown routine for the client device 202. The shutdown routine may control the hue and brightness of the display 212 via a display hue optimization module 314 and/or a display brightness optimization module 316. For instance, the hue optimization module 314 may shift the display from blue hue to a warmer yellow, orange, or red hue, which are less disruptive to sleep cycles. Additionally or alternatively, the system 300 may optimize the display brightness via the display brightness optimization module 316. For instance, the display brightness may be reduced via reducing power to a backlight or front light associated with the display. The system 300 may determine an optimized display via a combination of hue and brightness for the device display 212.

In some embodiments the system 300 may include one or more sensors such as an optical sensor 318 (e.g., video or still image camera), ambient light sensor 320, and/or one or more accelerometers 324. The sensors may detect user activity associated with the client device 202. For instance, the optical sensor 318 may detect the presence of a user 204 in front of the display 212 of the client device 202. A user presence may also be detected via infrared proximity detection or similar system. Furthermore, the optical sensor may detect eye movement associated with a user 204 of the client device 202 reading a book or consuming media on the display 212 of the client device 202. Similarly, the accelerators 324 may be used to detect physical movement of the client device 202. Movement over a threshold limit or a particular combination of movements may be associated with particular activity of the device (i.e., a user is in transit or walking). Movement over the threshold may indicate a higher like likelihood that a user 204 will be interacting with the device. For instance, a user history may indicate a high likelihood that a user 204 associated with the client device 202 may enjoy reading while walking, while on public transit (e.g., a bus or train), etc.

In some embodiments, an ambient light sensor 320 may determine ambient lighting situations. Ambient light may be factored into the brightness and hue optimization. For instance, a low ambient light scenario may trigger an intent by the user 204 to go to sleep and therefore trigger a shutdown routine. Furthermore, the ambient light may shift the shutdown routine. For instance, in low light an optimized shutdown routine may change hue and brightness at a slower rate than in a relatively high ambient light scenario. The rate of change of the hue and brightness is further limited by the maximum user perceptible change such that any change to the device display 212 is not detectable by the user 204 over time.

In some embodiments, the system 300 may further comprise a communication component 326 to send and receive data to a host computer network via a data communication network 218 (e.g., the cloud). For instance, the communication component 326 may be a wireless (Wi-Fi or radio) communication component that receives user account 208 data associated with a user 204 of the client device 202.

In further embodiments, the system 300 may have a database to locally store historical device data 322 on the client device 202. For instance, historical user interaction with the client device 202 such as consumed media, conditions during consumption (e.g., location, accelerometer measurements, optical sensor data, ambient light conditions, etc.).

In some instances, the historical user interactions may include one or more specific use cases. For example, the user may typically hold a client device 202 in a particular orientation while consuming book content. The client device 202 may record pressure and/or accelerometer readings and associate those readings with an activity of reading a book or similar content item. The pressure measurements may be a particular orientation of the user's holding pattern, for instance.

In additional embodiments, the client device 202 may detect jerking or dropping motions via one or more accelerometers and determine that a change in the holding pattern of the client device 202 by the user, the pressure associated with that holding pattern, the current activity of the user (e.g., reading a book or magazine), and/or the jerking/dropping motion are the result of the user falling asleep during reading. In some embodiments, the client device 202 may generate haptic feedback (e.g., vibrating the client device 202) at varying frequencies in order to stimulate the reader awake rather than encourage the reader to sleep.

Figure 4:
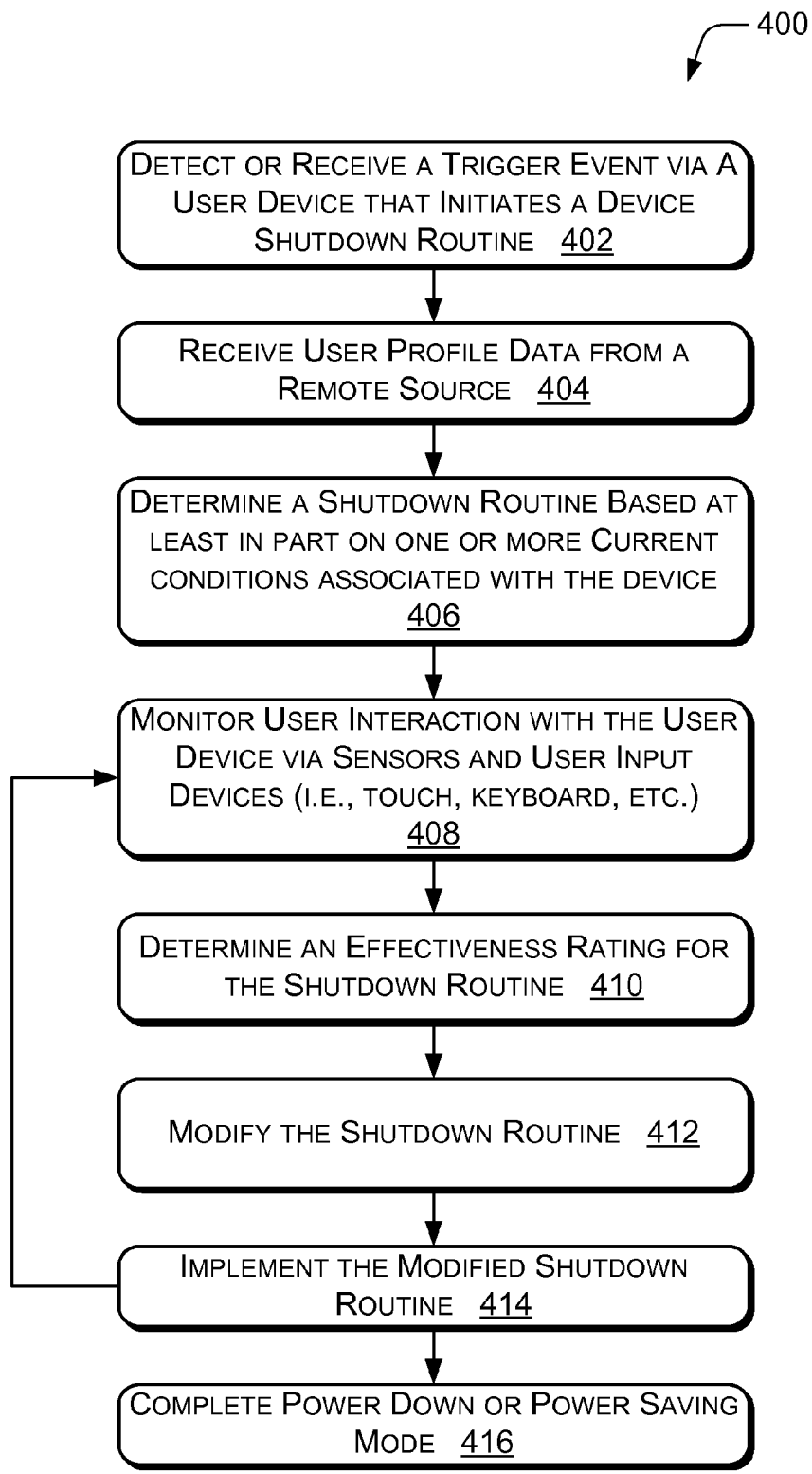
FIG. 4 is a flow diagram of an illustrative procedure for executing a shutdown routine for a client device.
Figure 5:
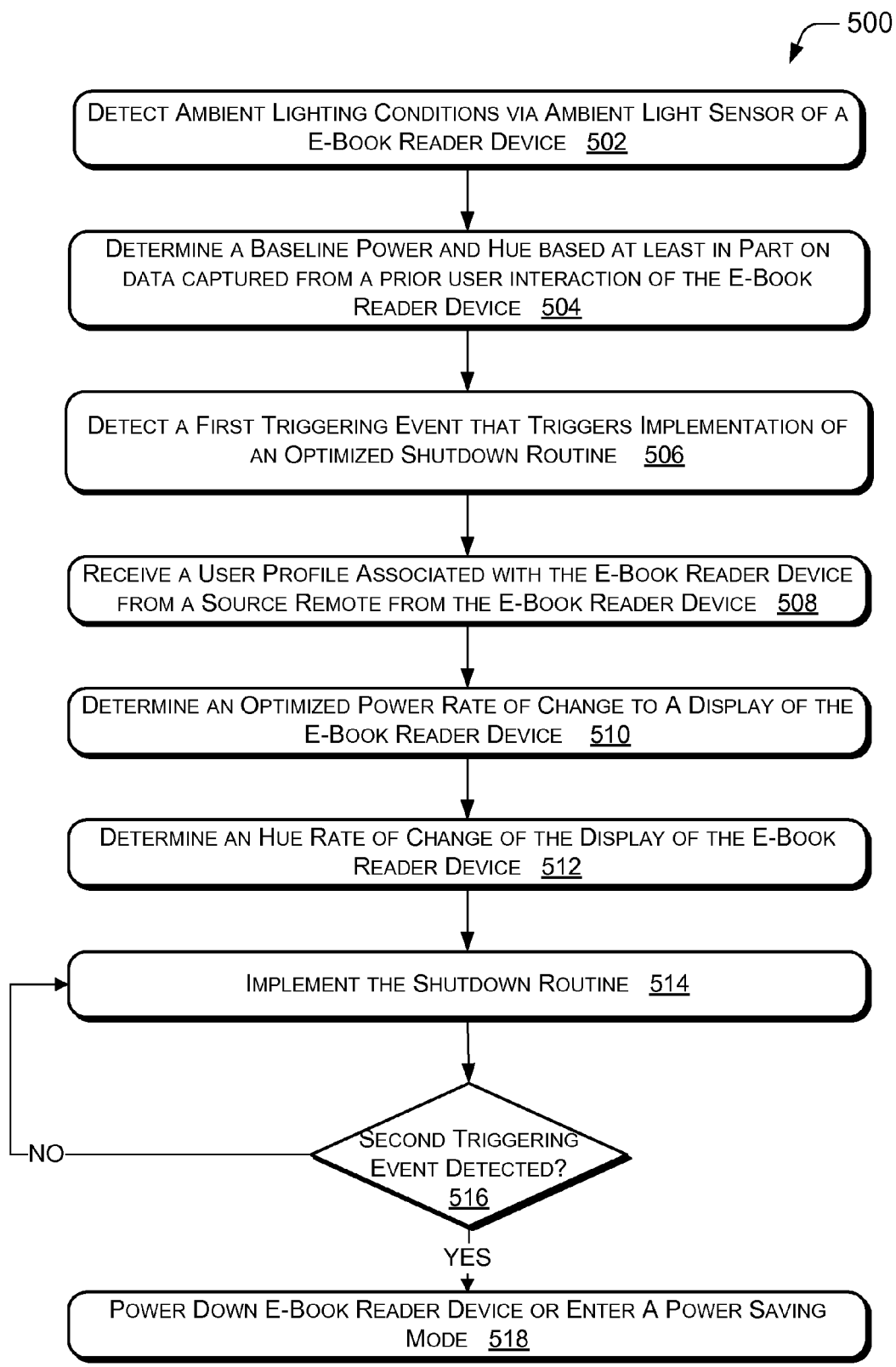
FIG. 5 is a flow diagram of an illustrative procedure for optimizing a shutdown routine for a client device.
Figure 6:
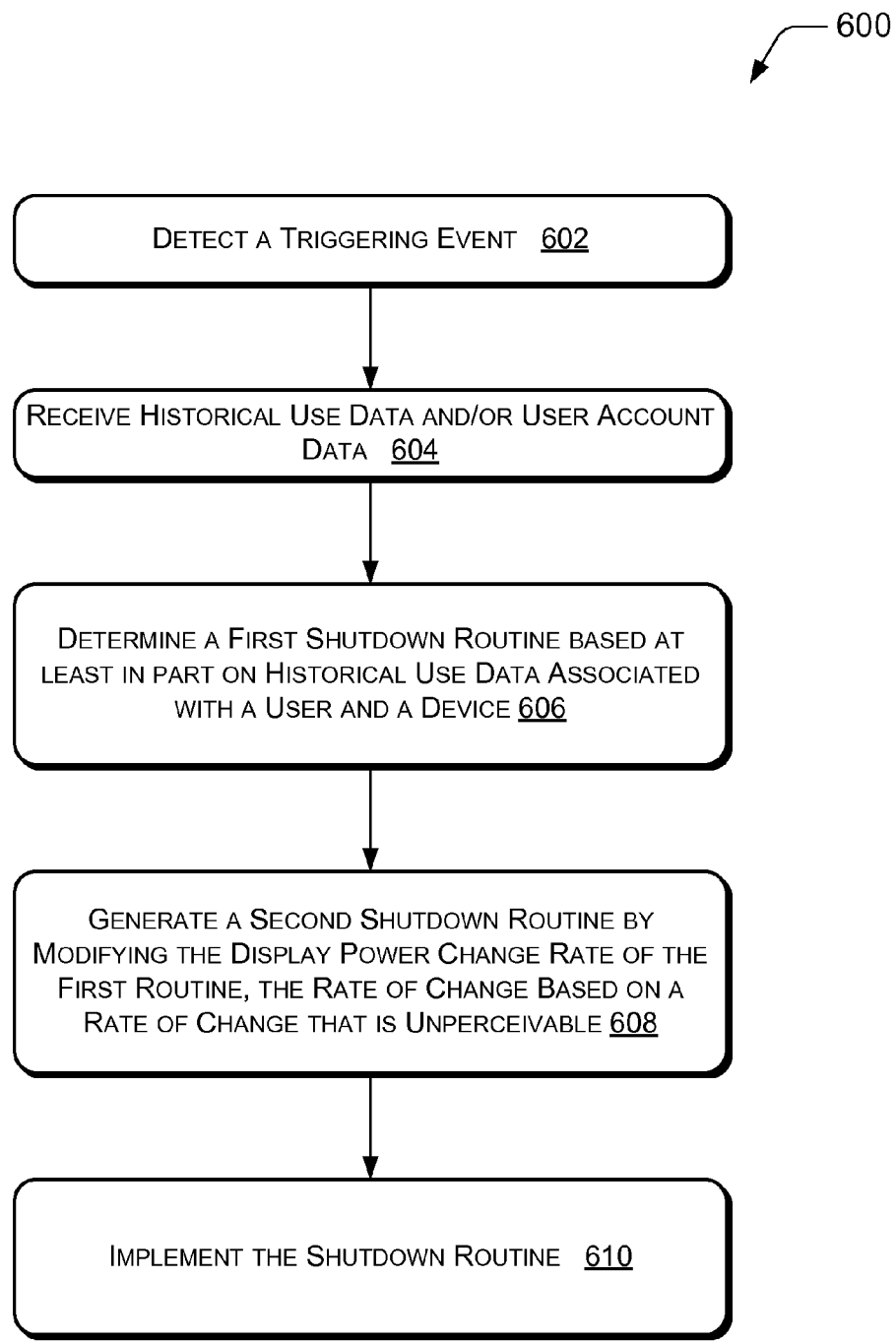
FIG. 6 is a flow diagram of an illustrative procedure 600 for determining a power-down rate of a client device 202 that is executing a shutdown routine.

FIGS. 4-6 show flow diagrams of illustrative processes. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. The processes are described with reference to at least FIGS. 1 and 2.

FIG. 4 is a flow diagram of an illustrative procedure for executing a shutdown routine for a client device 202.

At 402, the user device 202 detects and/or receives a trigger event. The trigger event may be a user selecting or setting the device in a "bedtime" or shutdown mode. In some embodiments, the client device 202 may detect a unique series of user interactions and/user inputs that initiate the shutdown mode. For example, a user 204 of the device may reduce the brightness of the device one or more times over a predetermined interval of time, or a user 204 set an alarm on the client device 202 or an associated user device 206.

At 404, the client device 202 receives user account data 208 associated with the user 204 of the device. The account data may be located on a remote server 208 or locally stored on the client device 202. Locally stored copies may be periodically synced with a remote source. The user account 208 may contain user preferences, user browsing and shopping habits, and other user settings and/or trends.

At 406, a shutdown routine is determined. The shutdown routine may be determined at a source remote to the client device 202, e.g. the host server(s) 208, or on the client device 202. The shutdown routine may be initiated using a previously determined shutdown routine and optimized or modified based on the most recent user inputs and/or changes in historical data associated with the user 204, client device 202, and/or associated user devices 206 over time. For instance, the client device 202 may receive from a user account 208, a prior shutdown routine associated with the user 204 and/or the client device 202. The shutdown routine may be further optimized based on user inputs, user account 208 changes, etc. that have occurred since the shutdown routine was initiated.

For example, if a user sets an alarm to wake up the following morning, the optimized shutdown routine may be accelerated relative to the baseline routine based on a determination that the user is likely trying to fall asleep. Additionally, the routine may be further accelerated relative to the baseline depending on the amount of time between the time that the alarm is set to go off and the current time. For instance, if the maximum amount of sleep time between the current time and the alarm time is less than six hours, the shutdown routine may be accelerated more than if the maximum amount of sleep is eight hours or more. Furthermore, the degree of acceleration of the shutdown routine may be relative to the user's 204 typical sleep patterns determined from historical data associated with the user 204, the client device 202, and or one or more associated user devices 206.

The client device 202 may continuously track and record user activity of the device. At 408, the client device 202 may monitor user activity associated with the shutdown routine. For instance, the client device 202 may record a decline or slowdown in the rate of user activity associated with the client device 202. In some embodiments the client device 202 may detect a change in the page turn rate of the user 204 within a media content such as a book, a reduced click rate associated with a user browsing activity, and/or the client device 202 may detect through a series of sensor measurements that the user 204 has likely put the client device 202 down and is no longer interacting with the client device 202.

In further embodiments, the client device 202 may detect a user activity that disrupts the shutdown routine. For example, a shutdown routine that is dimming the client device 202 to aid a user 204 in the act of falling asleep, the user 204 may increase the brightness of a display of the client device 202 indicating that the rate of dimming may be too fast for the user 204. Therefore, the shutdown routine may increase the period of time over which the client device 202 implements the shutdown routine. Additionally or alternatively, the shutdown routine may be suspended for a predetermined period of time before starting again.

Based at least in part on the monitored user activity, the device 202 may determine an effectiveness rating for the optimized shutdown routine at 410. The Effectiveness rating may include the rate of monitored user activity relative to the shutdown rate. For instance, if the shutdown routine is optimized for a thirty minute shutdown and at twenty eight minutes the device 202 has detected relatively little change in the monitored user activity, the effectiveness rating may be determined to be relatively low (i.e., the optimized shutdown routine has not aided the user 204 in efficiently falling asleep). If, on the other hand, the monitored user activity ends after only twenty minutes or significantly decreases after only twenty minutes, the effectiveness rating of the shutdown routine may be high (i.e., the user is sleeping and/or drowsy and therefore no longer interacting with the client device 202 or interacting with the client device 202 a reduced level of activity). The effectiveness rating is associated with the specific shutdown routine and stored on the client device 202 or associated with the user account 210 on a remote server 208 for later use. Stored shutdown routines may be used at a later time as a baseline routine based on the client device 202 at the later time. Additionally, the parameters of the shutdown routine and the condition detected by the client device 202 (e.g., time, location, device use conditions, sensor inputs, etc.), at the time the shutdown routine is executed may be used with machine learning techniques to effectively create baseline shutdown routines across a plurality of devices and users. For instance, routines with a high effectiveness rating may be used for other users of the client device 202 or the routines may be used by device associated with other users.

If the effectiveness rating is determined to be relatively low at the operation 410, the shutdown routine may be further modified to improve effectiveness. Modification of the optimized shutdown routine may be continuous or periodic. For instance, the modified shutdown routine may be accelerated relative to the optimized shutdown routine, the routine may shift to a brightness-dominated control wherein more emphasis is given to the brightness of the display 212 during shutdown, or the routine may shift to a hue-dominated control wherein the shutdown favors changes to display hue during the shutdown routine. The modified shutdown routine may be stored on the client device 202 and/or associated with the user account 208 for later use.

At 412, the modified shutdown routine may be created and at 414, the shutdown routine may be implemented or executed on the client device 202. The device may continually monitor (408), evaluate the effectiveness of the routine (410), and modify the routine (412) during use of the device 202, thus creating a looped process 418.

At 416, the shutdown routine may reach a minimum threshold power limit and/or detect a sufficiently low level of user activity to determine that the client device 202 may be powered down or placed in a power savings mode. Additionally or alternatively, the client device 202 may detect that the user 204 has released the client device 202 and is no longer interacting with the client device 202. For instance, the device may detect via an optical sensor that a user 204 is no longer in front of the display 212 or via accelerometers that the user has placed the device horizontally and determine, thereby, that the user 204 has released the client device 202. The client device 202 may also detect a combination of events (e.g., movements, user interactions with the client device 202, etc.) that triggers power down or power savings mode.

FIG. 5 is a flow diagram of an illustrative procedure 500 for optimizing a shutdown routine for a client device 202. The process 500 is described with reference to an electronic-book reading device ("e-book reader" device); however, the device may also be any handheld device such as a mobile phone, tablet, wearable device, or similar user electronic device.

At 502, the e-book reader device may detect ambient lighting conditions via an ambient light sensor. Characteristics of the detected lighting conditions may be used to determine a source of the light. For example, a light source may be determined to be incandescent lighting, fluorescent lighting, Light Emitting Diodes (LEDs), sun light, etc. A particular light source may be distinguished by one or more unique features of the lighting spectrum detected by the ambient light sensor. The determined lighting source may be indicative of a user's intent and therefore a factor in determining an optimized shutdown routine. For instance, if the device detects a high level of sun light, the optimized shutdown routine may determine that the user 204 interacting with the e-book reader is less likely to be going to sleep and no shutdown routine is required. Alternatively, if the light source is determined to be low levels of LED generated light, the optimized shutdown routine may determine that the user is reading the e-book reader using a reading light and therefore determine that a shutdown routine may be useful to aid the user in efficiently going to sleep.

Based at least in part on the determined ambient lighting conditions (e.g., strength, source, etc.) a baseline display power and display hue may be determined for the e-book reader device at 504. Baseline display power and hue may also be utilized to find a baseline shutdown routine. For instance, the shutdown optimization routine may compare the current display power and hue (and/or one or more other conditions associated with the e-book reader device) to prior shutdown routines to find a similar prior scenario. A shutdown routine associated with the similar prior scenario may be used as the baseline shutdown routine and further modified based on the current conditions associated with the e-book reader device.

At 506, a triggering event is detected via the e-book reader device. A triggering event may include one or a combination of events such as inactivity for a threshold period of time, the user setting down the device for a threshold period of time, the device detecting no user within the viewable angel of a camera of the device, detecting a slowed heart rate (via a heart rate sensor) or breathing rate (via an audio sensor) of the user, the user setting an alarm for some time in the future, etc. For instance, the device may detect that the a period of inactivity that is longer than a threshold period of inactivity, the device may detect that the e-book reader device has been set down and/or set down for a threshold period of time, the device may fail to detect the users presence via a proximity detection sensor or optical sensor, the device may detect (and/or receive from an associated device 206 via a host server(s) 208) an indication that the user of the device is experiencing a slowed heart rate that is below a threshold limit and therefore indicating that the user is falling asleep, the user may set an alarm on the device (and/or an associated device 206) indicating that the user is starting a bedtime routine, etc. The triggering event initiates a routine to optimize the baseline shutdown routine based on current conditions associated with the e-book reader device and/or the user.

At 508, the user account 210 associated with the e-book reader device and/or a user associated with the e-book reader device may be received from the remote source 208 (e.g., a host server(s)). For instance, the e-book reader device may receive the user account 210 data from a remote computing device via a wired wireless data connection. The user account 210 may contain one or more user preferences associated with the device shutdown, previous shutdown routines and associated conditions, and effectiveness ratings for each of the previous shutdown routines. The user account 210 may also contain data from associated devices 206, such as biometric data, or an indicator of biometric data, or calendar data, which may be applicable to determining an optimized shutdown routine.

At 510, a rate of change of the display power is determined based on the ambient conditions and user data associated with the user account 210. For instance, the ambient light sensor may detect a high ambient light condition wherein the current display power setting is relatively high along with a baseline power setting that is relatively low. The rate of change of the display power may therefore be accelerated until the display power meets or drops below the baseline power at which point the shutdown routine may slow the rate of power change according to an optimize shutdown routine.

Furthermore, the rate of power change may be limited to a maximum rate. The maximum rate may be predetermined based on the maximum change that is perceptible by a user of the device undergoing the display change. Additionally or alternatively, the rate of change may be limited based on the current lighting conditions and change to other display settings according to the shutdown routine (e.g., a combination of display setting changes such as power and hue simultaneously). For instance, ambient lighting conditions may limit the rate of change such that a use of the e-book reader device does not experience eyestrain due to the changing conditions. Rate change limits may be predetermined and/or dynamically determined based on monitoring user inputs over a period of time using a variety of display changes. Monitoring data may also be shared across users and device to further optimize the limits.

At 512, an optimized hue rate of change for the display is determined. For instance, if a user is going to bed the hue may transition from a cool-to-warm display to encourage a relaxing reading environment. Additionally or alternatively, the wavelength of the display light may shift from a traditional blue spectrum towards a longer wavelength of light (i.e., towards the red-end of the visible light spectrum) to reduce eyestrain and aid in the user's transition to sleep.

Alternatively, if the user is interacting with the device as the user wakes (e g, immediately after an alarm) the device may implement a combination of display power and hue changes that encourage the user to comfortably waken. For instance, the display power may be increased, the hue transition from warm-to-cool, and/or the wavelength of display light transition from a longer wavelength (i.e., red end of the visible light spectrum) towards a shorter wavelength blue light.

At 514, the optimized routine is implemented and e-book reader device interactions may be continuously monitored to determine an effectiveness rating of the routine. Furthermore, a second triggering event may be detected during the continuous monitoring at 516. The second triggering event may be an indication that the user has fallen asleep (i.e., no user interaction has been detected for a threshold period of time, no user is detectable via the imaging and/or proximity sensors, the user has turned off ambient light sources, etc.).

If a second triggering event is not detected, the shutdown routine may continue to a minimum setting level (a minimum display power and display a hue setting combination that may allow the user to comfortably interact with the e-book device) and the user interactions may continuously be monitored for a second triggering event. As long as no second triggering event is detected, the e-book reader device may remain at the minimum setting level until the user powers down the device or puts the device in a power saving mode. Additionally, the continuous monitoring may provide for continuous optimization of the shutdown routine.

At 518, the e-book device executes a power down or power savings routine in response to a detected second triggering event at 512.

FIG. 6 is a flow diagram of an illustrative procedure 600 for determining a power-down rate of a client device 202 that is executing a shutdown routine.

At 602, the client device 202 detects a triggering event. The triggering event may be a user selecting or setting the client device 202 to a "bedtime" mode. In some embodiments, the client device 202 may detect a unique series of user interactions and/or user inputs that result in the client device 202 being set to bedtime mode. For instance, a user 204 of the client device 202 may reduce the brightness of the device one or more times over a predetermined interval of time.

At 604, the client device 202 requests and receives historical user data from a remote user account 210. The user account 210 may contain browsing and purchase history on the client device 202 and/or browsing and purchase history 208(1) associated with one or more associated user devices 206(1)-(N). Additionally or alternatively, the user account 210 data may contain associated device data 208(2). Associated device data 208(2) may include schedule and calendar data stored on an associated device 206 and/or remotely in the user account 210. Additionally, the associated device data 208(2) may include client device 202 use data or associated user device 206 use data such as times of the day when a user 204 associated with the device is most active on the device or when the device is typically inactive. The associated device data 208(2) may also include alarm settings on the client device 202 and/or an associated user device 206(1)-(N).

The associated user device data 208(2) may include one or more prior shutdown routines associated with individual ones of the client device 202 and/or the associated user devices 206(1)-(N). The prior shutdown routines may be associated with one or more characteristic features. For instance, the prior shutdown routine may be associated with one or more conditions and/or triggering events that were present when the prior shutdown routine was created and executed. This may include the time of day, lighting condition, device use conditions, activity performed via the device (e.g., watching a video, reading a content item, etc.), associated user biometric data, etc.

The account data 208 may also include user preferences 208(3) associated with the client device 202 and/or individual one of the associated user devices 206(1)-(N). For instance, if the user 204 prefers a low brightness setting at a particular time of the day, under certain lighting conditions, or depending on the device and/or activity preformed via the device, this data is stored in the user preferences 208(3).

Responsive to the triggering event, at 606, a first shutdown routine is determined based on historical use data associated with the user 204 and the client device 202. For instance, a similarity score may be determined for one or more prior shutdown routines based on a comparison between the triggering event(s) and/or current conditions detected by the client device 202 and the triggering event(s) and/or associated conditions associated with the one or more prior shutdown routines. For instance, if the current conditions include that a user 204 is reading a book on an e-book device, the time is after 9:00 P.M., and the ambient light detected is relatively low, a prior shutdown routine associated with reading a magazine article at 10:00 P.M. under moderate lighting conditions may have a relatively high similarity score. However, a prior shutdown routine that is associated with watching a movie on the client device 202 during the daytime and under bright ambient light conditions may receive a relatively low similarity score.

In another embodiment, the similarity scores may be ranked and a first routine (or baseline routine) selected based on the highest-ranking similarity score. Similarity scores may be further weighted for varying factors to improve the scoring accuracy. For instance, the prior shutdown routine that is most recent may be weighted more favorably than an older prior shutdown routine. Other weighting examples include device weighting prior shutdown routines associated with the user 204 more favorably than a prior shutdown routine associate with a different user.

At 608, one or more parameters associated with the first shutdown routine may be modified based on current use conditions. For instance, if the first routine has an initial display brightness or hue setting that higher or lower relative to the current client device 202 settings, the display settings may transition from the current setting to the first routine setting more quickly that the first shutdown routine rate of shutdown. Once at the first settings, the shutdown routine progress at a rate according to the first routine settings.

In some instances if the ambient light conditions are significantly higher or lower than the ambient light conditions associated with the first routine, the parameters of the first routine may be adjusted to account for the difference in ambient light.

The modified parameters of the first routine create a second shutdown routine where the rate of change of any display setting is limited to a rate of change that is imperceptible to the user. The limit to the rate of change may be relative to the user 204 or a plurality of users of similar devices. For instance, prior shutdown routines may be shared between users of the same or similar devices to improve the effectiveness of the second shutdown routine.

At 612, the second shutdown routine is executed on the client device 202. Once executed, the second shutdown routine may be continuously monitored and tracked for effectiveness and continuously optimized. The second shutdown routine and measured effectiveness may be stored and associated with the user account 210 for later use as a prior shutdown routine.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. An electronic-book reader device to generate a shutdown routine, the electronic-book reader device comprising:
   a display;
   one or more processors;
   one or more sensors to detect one or more environmental conditions of the electronic-book reader device and user interactions received via the electronic-book reader device; and
   a computer-readable media storing computer-executable instructions that, when executed by one or more processors, perform acts comprising:
      detecting a triggering event via the one or more sensors, the triggering event including at least a first user interaction with the electronic-book reader device;
      detecting, via the one or more sensors and in response to detection of the triggering event, a current condition associated with the electronic-book reader device including at least an ambient light condition;
      determining, in response to the triggering event, a shutdown routine, based at least in part on the current condition and a history of accelerometer measurements associated with a particular use of the electronic-book reader device, to assist a user to fall asleep over a period of time, the shutdown routine modifying at least one of an amount of illumination emitted by the display or a color of the illumination emitted by the display over the period of time;
      initiating execution of the shutdown routine;
      monitoring at least one of a second user interaction with the electronic-book reader device or a biometric indicator associated with the user during the execution of the shutdown routine;
      modifying one or more parameters of the shutdown routine based at least in part on the second user interaction with the device, the one or more parameters including at least one of the amount of illumination emitted by the display or the color of the illumination emitted by the display; and
      executing the shutdown routine using the modified one or more parameters.

2. The electronic-book reader device of claim 1, wherein the acts further comprise detecting a third user interaction that disrupts the shutdown routine and further modifying the shutdown routine to lengthen the period of time.

3. The electronic-book reader device of claim 1, wherein the acts further comprise implementing the shutdown routine selected from a shutdown model, the shutdown model being based at least in part on the accelerometer measurements.

4. The electronic-book reader device of claim 1, wherein the biometric indicator is received from one or more additional devices associated with the user and the biometric indicator includes at least one or more of a heart rate, a breathing rate of the user associated with the electronic-book reader device, or a blink rate of the user.

5. A method comprising:
   receiving, via a client device, an indication of a condition associated with use of the client device, the indication of the condition being at least partially based on biometric data;
   implementing, in response to the indication of the condition, a first tiredness-increasing routine on the client device over a period of time, the first tiredness-increasing routine being based at least in part on data captured from prior interaction data from the client device;

receiving a user interaction with the client device to disrupt the first tiredness-increasing routine;

modifying, based at least in part on the user interaction, the first tiredness-increasing routine to create a second tiredness-increasing routine, the second tiredness-increasing routine having an extended period of time, the second tiredness-increasing routine comprising at least one of:

changing a color of a display of the client device from a warm hue to a cool hue over the period of time; or changing the color of the display of the client device from the cool hue to the warm hue over the period of time; and executing the second tiredness-increasing routine on the client device.

6. The method of claim 5, wherein the changing a color of a display is limited to an imperceptible rate of change.

7. The method of claim 5, further comprising receiving, from one or more other client devices associated with the user, the biometric data, and wherein the one or more other client devices include at least one of a mobile phone, a tablet computing device, a personal computer, a device that generates biometric data, or a wearable device.

8. The method of claim 5, wherein the biometric data includes at least one of a heart rate, blood pressure, eye movement, or breathing rate.

9. The method of claim 5, wherein the indication is associated with the user being present within an angle of view of a camera of the client device.

10. The method of claim 5, wherein the user interaction increases the amount of illumination of the display and the first tiredness-increasing routine is suspended for a predetermined period of time.

11. A non-transitory computer readable media to store computer-executable instructions that, when executed, cause one or more processors to preform acts comprising:

detecting a triggering event that indicates that a user associated with a device intends to stop using the device at a time in the future;

receiving historical use data associated with the user and the device, the historical data including one or more peak use times of the device and an associated activity of the user during the one or more peak use times;

determining, based at least in part on the historical use data, a shutdown routine to increase a user tiredness, the shutdown routine including at least a rate of illumination change and a rate of color change of a display of the device; and executing the shutdown routine.

12. The non-transitory computer readable media of claim 11, the acts further comprising:

detecting a biometric indicator associated with the user; and modifying the shutdown routine based at least in part on the biometric indicator.

13. The non-transitory computer readable media of claim 12, wherein the biometric data includes at least one of a heart rate, a blood pressure, or a blink rate.

14. The non-transitory computer readable media of claim 11, wherein the rate of illumination change and the rate of color change are limited to a rate of change that is imperceptible.

15. The non-transitory computer readable media of claim 11, wherein the determining the shutdown routine further comprises:

determining a current activity of the user based on sensor data or a biometric indicator, and wherein the sensor data or the biometric indicator are generated from one or both of the device or a second device associated with the user;

determining, based on the current activity of the user, that the user intends to increase alertness; and increasing at least one of the rate of illumination change or the rate of color change of a display of the device.

16. The non-transitory computer readable media of claim 11, wherein the determining the shutdown routine further comprises:

determining a current activity of the user based on sensor data or a biometric indicator, and wherein the sensor data or the biometric indicator are generated from one or both of device or a second device associated with the user;

determining, based on the current activity of the user, that the user intends to increase tiredness; and increasing least one of the rate of illumination change or the rate of color change of a display of the device.

17. The non-transitory computer readable media of claim 11, further comprising:

detecting a period of inactivity of the device; and increasing at least one of the rate of illumination change or the rate of color change of a display of the device.

18. The non-transitory computer readable media of claim 11, wherein a color of the display of the device changes from warm-to-cool to increase user alertness by increasing the wavelength of the color of the display or the color of the display changes from cool-to-warm to increase the user tiredness by decreasing the wavelength of the color of the display.

* * * * *